United States Patent Office 3,739,029
Patented June 12, 1973

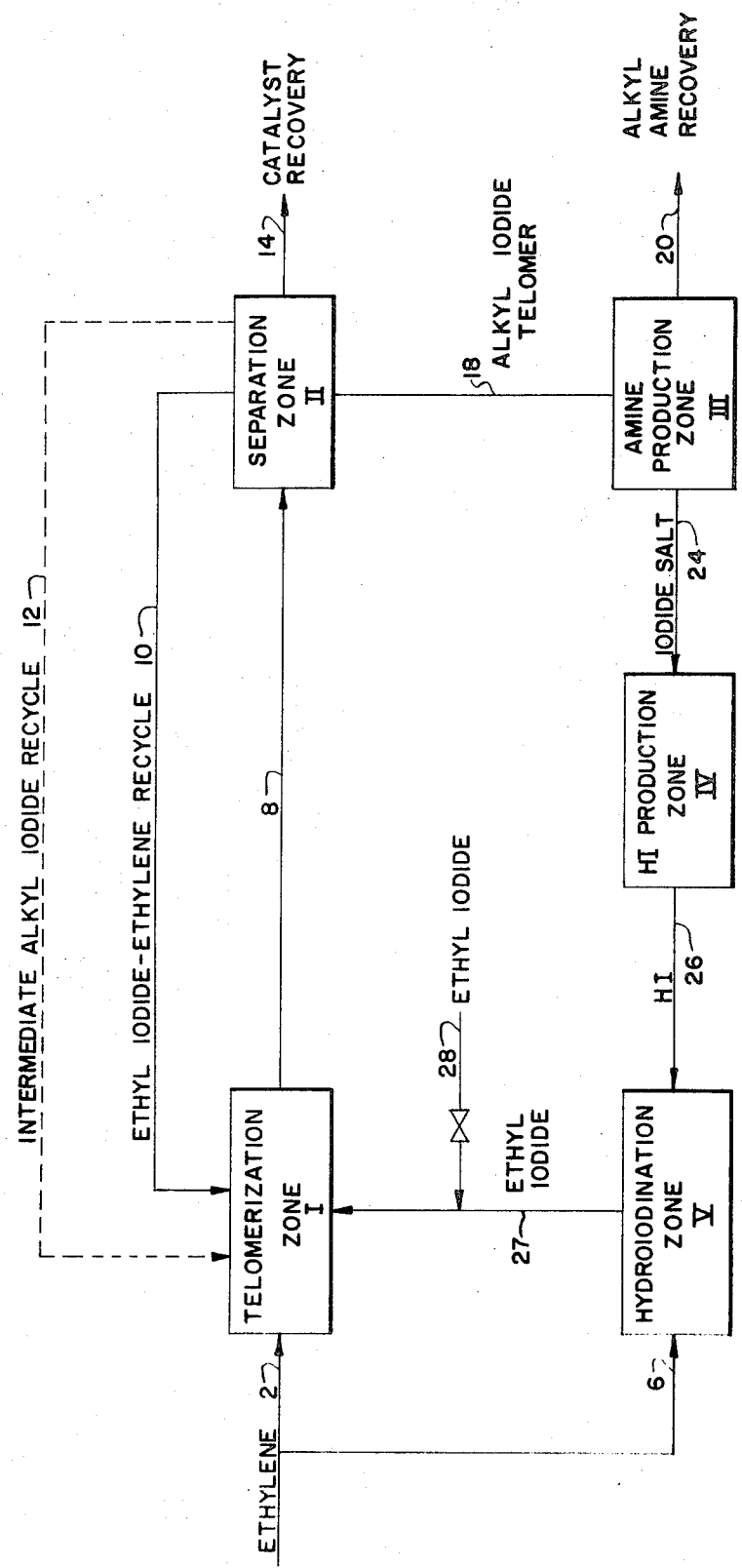

3,739,029
N-ALKYL AMINE PRODUCTION
Eugene F. Magoon, Walnut Creek, and Lynn H. Slaugh, Lafayette, Calif., assignors to Shell Oil Company, New York, N.Y.
Continuation of abandoned application Ser. No. 832,307, June 11, 1969. This application Dec. 29, 1971, Ser. No. 213,770
Int. Cl. C07c 85/02
U.S. Cl. 260—585 A    5 Claims

ABSTRACT OF THE DISCLOSURE

Ethylene is converted to n-alkyl amines by (1) telomerizing ethylene and ethyl iodide to primary n-alkyl iodides, (2) reacting the n-alkyl iodide with ammonia or an amine to produce a n-alkyl amine hydroiodide, (3) treating the amine hydroiodide with a base to produce a n-alkyl amine and an iodide salt, (4) converting the iodide salt to hydrogen iodide and (5) hydroiodinating ethylene with the hydrogen iodide to produce ethyl iodide for recycle to provide the ethyl iodide for telomerization with ethylene.

This application is a continuation of application Ser. No. 832,307 filed June 11, 1969, now abandoned.

BACKGROUND OF THE INVENTION

Aliphatic amines having a long chain ($C_{10}$–$C_{20}$) n-alkyl moiety attached directly by a terminal carbon atom to the nitrogen atom are compounds of established utility in a variety of applications. Such aliphatic amines are particularly useful for the production of surface-active agents. For example, a tertiary amine having one long chain ($C_{10}$–$C_{20}$) n-alkyl group and two lower alkyl groups, e.g., dimethyl n-lauryl amine, is reacted with hydrogen peroxide to produce the corresponding amine oxide which is effective as a surface active agent of the water-soluble variety.

It would be useful to prepare long chain n-alkyl amines by a process which utilizes readily available ethylene as a starting material. Particularly useful would be a process which converts ethylene to long chain n-alkyl amines of a selected range of carbon atoms in the n-alkyl group.

SUMMARY OF THE INVENTION

It has now been found that n-alkyl amines can be produced from ethylene in a cyclic-type process which comprises: (1) telomerizing ethylene and ethyl iodide to produce primary n-alkyl iodide telomer in the presence of iron metal, copper metal, zinc metal, a copper chelate of a β-dicarbonylic compound monoenolate or a low-valent organometallic compound of a metal of Group VI–B, VII–B or VIII of the Periodic Table; (2) separating and treating the n-alkyl iodide telomer with ammonia or lower alkyl amine to produce n-alkyl amine hydroiodide; (3) contacting the n-alkyl amine hydroiodide with a base to produce an n-alkyl amine and an iodide salt; (4) converting the iodide salt to hydrogen iodide and (5) hydroiodinating ethylene with the hydrogen iodide to produce ethyl iodide for recycle and further telomerization with ethylene.

BRIEF DESCRIPTION OF THE DRAWING

For a better understanding of the invention, recourse is had to the accompanying drawing wherein the sole figure is a schematic flow diagram showing two modifications of the process of the invention. In the drawing, I designates a telomerization zone, II a separation zone, III an amine production zone, IV a hydrogen iodide production zone and V a hydroiodination zone. For convenience and clarity, apparatus not essential to a complete understanding of the invention such as means for providing heat, refrigeration, stirring, pressure control, cooling, separations and the like have been omitted from the drawing. The selection and location of such means will be apparent to one skilled in this art.

With reference to the drawing, one modification of the process may be summarized as follows. The telomerization catalyst, ethyl iodide and reaction diluent are charged to the telomerization reaction zone I, maintained at desired reaction conditions of temperature and pressure. Ethylene is introduced through line 2. The resulting reaction mixture comprising n-alkyl iodide telomers is removed through line 8 to a separation zone II wherein unreacted ethylene and ethyl iodide are separated and recycled to the telomerization reactor through line 10. Any by-products and catalyst may be removed by line 14. The n-alkyl iodide telomers are passed through line 18 to the amine production zone III wherein the n-alkyl iodide telomers are converted by treatment with ammonia or an amine to produce n-alkyl amine hydroiodide salts, which are treated with a base to produce n-alkyl amines and an iodide salt solution. The n-alkyl amines are separated and recoverd through line 20 and the iodide salt solution is passed through line 24 to the hydrogen iodide production zone IV wherein the iodide is converted to hydrogen iodide. The hydrogen iodide is passed through line 26 to the hydroiodination zone V wherein it is contacted with ethylene introduced through line 6 to produce ethyl iodide. The resulting ethyl iodide is recycled through line 27 to the telomerization zone. Line 28 is provided for introducing ethyl iodide into the telomerization zone when starting up the process. Once underway, such introduction is stopped, except for any required makeup, and the necessary ethyl iodide reactant is continuously made available from the hydroiodination zone V.

In another modification, which is a preferred modification, the alkyl iodide telomer products from the telomerization zone are separated in the separation zone II into a higher alkyl iodide telomer fraction of a selected range of carbon atoms, e.g., $C_{10}$–$C_{20}$, and an intermediate alkyl iodide telomer fraction of carbon atoms up to the lowest carbon number of the higher alkyl iodide fraction. The intermediate alkyl iodide fraction is recycled through line 12 to the telomerization zone for further reaction with ethylene to produce additional higher alkyl iodide products. The higher alkyl iodide fraction is passed through line 18 to the amine production zone III. In this modification, a selected range of higher n-alkyl amines, preferably in the $C_{14}$–$C_{20}$ carbon range, is produced from ethylene.

DESCRIPTION OF THE PREFERRED EMBODIMENTS

Telomerization.—The telomerization of ethylene and ethyl iodide to produce primary alkyl iodide telomers is conducted by contacting ethylene and ethyl iodide in the presence of a catalyst selected from iron metal, copper metal, zinc metal, a copper chelate of a β-dicarbonylic compound monoenolate, e.g., copper acetylacetonate, a low-valent organometallic compound of a metal of Group VI–B, VII–B and VIII of the Periodic Table, e.g., chromium, molybdenum, tungsten, manganese, rhenium, iron, ruthenium, osmium, cobalt, rhodium, iridium, nickel, palladium and platinum. Suitable low-valent organometallic compounds of metals of Group VI–B, VII–B and VIII have at least two ligands independently selected from (i) carbon monoxide, (ii) tertiary organophosphine of from 3 to 60 carbon atoms and (iii) cyclopentadienyl ligand of from 5 to 30 carbon atoms.

The telomerization of alkyl iodides with iron, copper or zinc metal catalyst is described in copending application, Ser. No. 832,465, now U.S. Pat. 3,641,170 of Nakamaye et al., the telomerization of alkyl iodides with a copper chelate of β-dicarbonylic compound monoenolate is described in copending application, Ser. No. 832,431, now U.S. Pat. 3,641,171 of Spooncer, and the telomerization of alkyl iodides with a low-valent organometallic catalyst of a metal of Group VI–B, VII–B or VIII is described in applicants' copending application, Ser. No. 833,891 filed on June 11, 1969. The disclosures of these copending applications are herewith incorporated by reference.

The telomerization reaction is conducted in the liquid phase in the presence of a reaction diluent which is liquid at reaction temperature and pressure and is inert to the reactants, catalyst and the products produced therefrom. Suitable diluents include non-hydroxylic diluents such as hydrocarbons free from aliphatic unsaturation, e.g., hexane, heptane, octane, decane, dodecane, cyclohexane, tetrahydronaphthalene, benzene, toluene and xylene. Preferred reaction diluents comprise mononuclear aromatic hydrocarbons of from 6 to 12 carbon atoms. Amounts of reaction diluent up to about 30 times the weight of alkyl iodide reactant are typically employed.

The telomerization process is conducted by any of a variety of procedures. In one modification, the ethylene, iodide reactant, catalyst and diluent are charged to an autoclave or similar pressure reactor for operation in a batchwise manner. In another modification, the process is effected in a continuous manner as by contacting the entire reaction mixture during passage through a tubular reactor. By any modification, the process is most efficiently conducted at elevated temperature and pressure. In general, temperatures varying from about 50° C. to about 250° C. are satisfactory with temperatures from about 75° C. to about 200° C. being preferred. Suitable reaction pressures are those which serve to maintain the reaction mixture substantially in the liquid phase. Reaction pressures from about 10 atmospheres to about 200 atmospheres in general are satisfactory. The telomerization reaction is suitably conducted in an inert reaction environment so that the presence of reactive materials such as water and oxygen is desirably avoided. Reaction conditions are therefore substantially anhydrous and substantially anhydrous and substantially oxygen-free.

Separation zone.—The product mixture from the telomerization zone is passed to the separation zone II. The separation zone II may comprise a suitable fractional distillation unit or similar conventional separation apparatus. Unreacted ethyl iodide and ethylene as well as any recovered catalyst and diluent recycled to the telomerization zone I. The primary n-alkyl iodide telomer product is separated and passed to the amine production zone III. Alternatively, the alkyl iodide telomers are separated into a higher alkyl iodide telomer fraction of a selected range of carbon atoms and a lower intermediate alkyl iodide fraction, based upon differences in boiling points. The range of carbon atoms of the higher alkyl iodide telomers can be any suitable range desired. Useful ranges of carbon atoms vary from about 2 carbon-numbers to 10 carbon-numbers, e.g., $C_8$–$C_{10}$, $C_8$–$C_{12}$, $C_8$–$C_{14}$, $C_8$–$C_{16}$, $C_{10}$–$C_{12}$, $C_{10}$–$C_{14}$, $C_{10}$–$C_{16}$, $C_{10}$–$C_{20}$, $C_{12}$–$C_{16}$, $C_{14}$–$C_{20}$, $C_{20}$–$C_{24}$, and the like. The lower alkyl iodide fraction includes fraction $C_4$ (n-butyl iodide) up to the carbon-numbers of the highest alkyl iodide in the higher alkyl iodide fraction, but preferably includes only from $C_4$ up to the carbon-number of the lowest alkyl iodide in the higher alkyl iodide fraction.

Amine production.—In the amine production zone III the primary n-alkyl iodide telomers are converted to amines by the reaction of the n-alkyl iodide with ammonia, primary amines or secondary amines by suitable conventional methods. It is appreciated, of course, that the reaction of n-alkyl iodides with ammonia produces primary alkyl amines, the reactitn of n-alkyl iodides with primary amines produces secondary amines and the reaction of n-alkyl idodies with secondary amines produces tertiary amines.

Suitable primary amines are lower ($C_1$–$C_4$) primary alkyl or alkanyl amines such as methylamine, ethylamine, propylamine, allylamine, butylamine and crotylamine and suitable secondary amines are corresponding lower ($C_1$–$C_4$) secondary amines such as dimethylamine, diethylamine, diisopropylamine, diallylamine and dibutylamine and corresponding mixed amines, e.g., methyl ethylamine. Preferred amine reactants are methylamine and dimethylamine.

An excess of the ammonia or amine reactant is generally employed. For example, molar ratios of ammonia or amine to alkyl iodide of from about 2:1 to 50:1 are satisfactory, although molar ratios of about 5:1 to 20:1 are preferred.

The reaction of the n-alkyl iodide with the ammonia or amine is generally conducted in the liquid phase in the presence of solvents such as water and polar organic compounds. In general, all organic solvents having less than 10 carbon atoms and containing either hydroxyl, nitrile, carbonyl, carboxylate or like polar substituents are applicable. Exemplary suitable solvent are dimethylformamide, dimethylsulfoxide, acetonitrile, propionitrile, acetone and lower alcohols such as methanol and ethanol. namide,a The conversion of the alkyl iodide to amine may be carried out batchwise, intermittently or continuously. By any method of operation, reaction conditions generally comprise the use of elevated temperature and pressure. In general, temperatures of from 50° C. to about 300° C., more preferably from about 100° C. to about 300° C., are employed. Suitable pressures may vary from about 1 atmosphere to about 100 atmospheres.

Subsequent to the reaction of the n-alkyl iodide with ammonia or amine, the unreacted excess of ammonia or amine used in the process is recovered for reuse by distillation and water, if necessary, is added to dissolve the n-alkyl amine hydroiodide salt formed. The amine hydroiodide salt is separated and the solution is treated with the required amount of a base to produce a free amine and an aqueous iodide salt solution. Preferred bases are inorganic bases such as aqueous alkali or alkaline earth metal hydroxide or carbonate, e.g., sodium hydroxide or sodium carbonate. The free n-alkyl amine is separated and recovered as product and the iodide salt solution is employed for hydrogen iodide production.

In certain modifications of the process it is desirable to contact the n-alkyl iodide with ammonia or amine in the presence of a base so that the amine hydroiodide product is neutralized in situ to produce a free amine and an iodide salt.

Hydrogen iodide production.—The iodide salt solution is converted to hydrogen iodide by any conventional method. In a preferred method, the iodide salt is acidified with a strong inorganic acid such as hydrogen chloride, sulfuric acid or phosphoric acid to produce a solution of hydrogen iodide, which is suitably employed, with or without purification or concentration, for reaction with ethylene to produce ethyl iodide. In another method, the iodide salt solution is treated with gaseous chlorine to produce iodine which is recovered and reacted with hydrogen to yield hydrogen iodide. In this method, the iodide solution is adjusted to pH in the range of 2 to 5 and heated to a temperature of from about 30°–50° C. Chlorine gas is contacted with heated solutions and the resulting iodine product is recovered. The iodine recovered is subsequently reacted with hydrogen in any conventional manner to form hydrogen iodide.

Hydroiodination.—The preparation of ethyl iodide by the reaction of hydrogen iodide and ethylene in the hydroiodination zone V can be conducted by any conventional method. In one modification, ethylene and hydrogen iodide are contacted in the fluid phase, e.g., liquid or gaseous, in the presence or absence of an inert reaction diluent. In another modification, ethylene and hydrogen iodide are contacted in the presence of a conventional hydrohalogenation catalyst. By any modification, suitable reaction temperatures and pressures vary over a wide range. Temperatures varying from −20° C. to 500° C. and pressures varying from 1 atmosphere to 100 atmospheres are generally satisfactory.

Subsequent to the hydroiodination reaction, the ethyl iodide product is separated by conventional means such as fractional distillation, selective extraction and the like. The ethyl iodide is recycled to the telomerization reactor.

Although it is preferable to carry out the hydroiodination reaction in a separate reaction zone (V), this reaction can be effected within the telomerization zone (I) itself thereby eliminating the requirement of a separate hydroiodination zone. By control of the reaction conditions in the telomerization zone (I) substantially complete reaction of hydrogen iodide with excess ethylene can be caused to take place with no detrimental effect on the telomerization reaction.

EXAMPLE I

The telomerization of ethylene with ethyl iodide in the presence of bis(triphenylphosphine)tricarbonylruthenium as catalyst in benzene solvent is conducted in an autoclave designated in the drawing as telomerization zone I. Catalyst to ethyl iodide molar ratio of 1:40 and ethylene to ethyl iodide molar ratio of 20:1 are employed. The autoclave is maintained at a temperature of 150° C. and a pressure of 1000–1500 p.s.i.g. The alkyl iodide components of the resulting product mixture comprise 22 mole percent unreacted ethyl iodide, 20 mole percent n-butyl iodide, 20 mole percent n-hexyl iodide, 15 mole percent n-octyl iodide, 10 mole percent n-decyl iodide, 6 mole percent n-dodecyl iodide, 4 mole percent n-tetradecyl iodide, 2 mole percent n-hexadecyl iodide and 1 mole percent n-octadecyl iodide.

The product mixture is withdrawn and the ethylene, catalyst, benzene and $C_2$ to $C_{10}$ n-alkyl iodide products are separated and recycled to the telomerization reaction. The $C_{12}$ to $C_{18}$ n-alkyl iodide telomer products are treated with a 10 molar excess of ammonia in aqueous isopropanol solution in an autoclave, designated as the amine production zone III, which is maintained at a temperature of 50–100° C. The excess ammonia is distilled off along with the isopropanol from the resulting product mixture. The residue containing the n-alkyl amine hydroiodide product is then treated with caustic soda solution to liberate the amine which is separated and recovered.

The resulting aqueous iodide solution is then acidified with hydrochloric acid to produce an aqueous hydrogen iodide solution. The hydrogen iodide solution is then contacted with excess ethylene in an autoclave, designated in the drawing as the hydroiodination zone IV, which is maintained at 100–150° C. The resulting ethyl iodide product and unreacted ethylene are separated and utilized for recycle to the telomerization zone I.

EXAMPLE II

The telomerization of ethylene with n-butyl and n-hexyl iodide was conducted in the presence of bis(triphenylphosphine)tricarbonyl-ruthenium as catalyst. Each reaction was conducted with 0.5 millimole of the catalyst, 20 millimoles of the indicated alkyl iodide, 30 ml. of benzene and at an initial ethylene pressure of 800 p.s.i.g. and at a temperature of 125° C. The reaction conditions and results are provided in Table I.

TABLE I

| Run | 1 | 2 |
|---|---|---|
| Alkyl iodide reactant | n-Butyl | n-Hexyl |
| Conversion of alkyl iodide, percent | 58 | 33 |
| Product selectivity, mole percent: | | |
| n-Hexyl iodide | 40 | |
| n-Octyl iodide | 26 | 53 |
| n-Decyl iodide | 16 | 30 |
| n-Dodecyl iodide | 10 | 14 |
| n-Tetradecyl iodide | 6 | 4 |

We claim as our invention:
1. A process of converting ethylene to n-alkyl amines by:
   (1) telomerizing in a first reaction zone ethylene and ethyl iodide to a mixture of even-carbon-number linear primary alkyl iodide telomers in the presence of a catalyst selected from (a) iron metal, (b) copper metal, (c) zinc metal, (d) a copper chelate of a β-dicarbonylic compound monoenolate and (e) a low-valent organometallic compound of a metal of Group VI–B, VII–B or VIII of the Periodic Table, said organometallic compound having at least two ligands independently selected from (i) carbon monoxide, (ii) tertiary organophosphine of from 3 to 60 carbon atoms and (iii) cyclopentadienyl ligand of from 5 to 30 carbon atoms, in the liquid phase in inert reaction diluent at a temperature of from about 50° C. to 250° C.;
   (2) separating and reacting the mixture of primary n-alkyl iodide telomers with ammonia or a lower alkyl primary or secondary amine to produce a n-alkyl amine hydroiodide;
   (3) contacting the n-alkyl amine hydroiodide with a base to produce a n-alkyl amine and an iodide salt;
   (4) converting the iodide salt to hydrogen iodide; and
   (5) hydroiodinating ethylene with the hydrogen iodide to produce ethyl iodide and recycling it to the first reaction zone.
2. A process of converting ethylene to linear n-alkyl amines by:
   (1) telomerizing in a first reaction zone ethylene and ethyl iodide to a mixture of even-carbon-number linear primary alkyl iodide telomers in the presence of a catalyst selected from (a) iron metal, (b) copper metal, (c) zinc metal, (d) a copper chelate of a β-dicarbonylic compound monoenolate and (e) a low-valent organometallic compound of a metal of Group VI–B, VII–B or VIII of the Periodic Table, said organometallic compound having at least two ligands independently selected from (i) carbon monoxide, (ii) tertiary organophosphine of from 3 to 60 carbon atoms and (iii) cyclopentadienyl ligand of from 5 to 30 carbon atoms, in the liquid phase in inert reaction diluent at a temperature of from about 50° C. to 250° C.;
   (2) separating the resulting mixture of primary n-alkyl iodide telomers into a higher alkyl iodide telomer fraction of a selected range of carbon atoms and a lower intermediate alkyl iodide telomer fraction;
   (3) returning the intermediate alkyl iodide telomer fraction to the first reaction zone for further telomerization with ethylene;
   (4) reacting the higher n-alkyl iodide telomer fraction with ammonia or a lower alkyl primary or secondary amine to produce a n-alkyl amine hydroiodide;
   (5) contacting the n-alkyl amine hydroiodide with a base to produce a n-alkyl amine and iodide salt;

(6) converting the iodide salt to hydrogen iodide; and
(7) hydroiodinating ethylene with hydrogen iodide to produce ethyl iodide and recycling it to the first reaction zone for further telomerization.

3. The process of claim 2 wherein the iodide salt is treated with a strong inorganic acid to produce hydrogen iodide.

4. The process of claim 2 wherein the iodide salt is reacted with chlorine to produce iodine which is reacted with hydrogen to produce hydrogen iodide.

5. The process of claim 2 wherein the range of carbon atoms of the higher alkyl iodide fraction is $C_{10}$–$C_{20}$.

References Cited
UNITED STATES PATENTS 3,401,203  9/1968  Kraiman et al. ____ 260—583 R
3,471,562  10/1969  Wakeman et al. ___ 260—583 R LEWIS GOTTS, Primary Examiner D. R. PHILLIPS, Assistant Examiner U.S. Cl. X.R.
260—652 R